(12) United States Patent
Baracca et al.

(10) Patent No.: US 11,898,605 B2
(45) Date of Patent: Feb. 13, 2024

(54) BEARING UNIT FOR WINDROWERS

(71) Applicant: AKTIEBOLAGET SKF, Gothenburg (SE)

(72) Inventors: Fausto Baracca, Massa (IT); Fabio Cavacece, Rome (IT); Andrea A Bertolini, Carrara (IT)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 17/739,248

(22) Filed: May 9, 2022

(65) Prior Publication Data

US 2022/0364596 A1 Nov. 17, 2022

(30) Foreign Application Priority Data

May 14, 2021 (IT) .................. 102021000012428

(51) Int. Cl.
*F16C 23/08* (2006.01)
*F16C 33/58* (2006.01)
*F16C 35/063* (2006.01)
*F16C 33/46* (2006.01)
(Continued)

(52) U.S. Cl.
CPC .......... *F16C 33/4605* (2013.01); *F16C 19/06* (2013.01); *F16C 23/084* (2013.01); *F16C 33/49* (2013.01); *F16C 33/586* (2013.01); *F16C 35/063* (2013.01); *F16C 2226/62* (2013.01)

(58) Field of Classification Search
CPC ...... F16C 19/06; F16C 23/082; F16C 23/084; F16C 33/49; F16C 33/586; F16C 33/60; F16C 35/063; F16C 2226/62
See application file for complete search history.

(56) References Cited

U.S. PATENT DOCUMENTS 2,501,100 A * 3/1950 Shafer .................. F16D 1/0847
403/247
2,766,080 A 10/1956 Fineran
(Continued)

FOREIGN PATENT DOCUMENTS

DE 102019119705 A1 * 5/2020 .......... B62D 5/0409
GB 670403 4/1952
(Continued)

OTHER PUBLICATIONS

Search Report for corresponding Italy Patent Application No. 2021000012428 dated Jan. 18, 2022.
(Continued)

*Primary Examiner* — Phillip A Johnson
(74) *Attorney, Agent, or Firm* — Reed Smith LLP

(57) ABSTRACT

A bearing unit comprising a radially outer ring having a radially outer spherical surface with a convex shape, a radially inner ring mounted on a rotating or oscillating shaft, and a plurality of rolling bodies interposed between the radially outer ring and the radially inner ring to allow the relative rotation of the radially inner ring and outer ring; a locking system for locking the bearing unit being provided with two threaded through holes that are made through the radially inner ring from opposite sides with respect to the radially outer ring and to the plurality of rolling bodies, and, for each threaded through hole with a respective grub screw locking the radially inner ring on the shaft.

4 Claims, 1 Drawing Sheet

(51) Int. Cl.
    *F16C 19/06*        (2006.01)
    *F16C 33/49*        (2006.01)

(56) References Cited

U.S. PATENT DOCUMENTS

| | | | | | |
|---|---|---|---|---|---|
| RE26,591 | E | * | 5/1969 | Kay | F16C 33/605 |
| | | | | | 384/585 |
| 3,623,782 | A | * | 11/1971 | Nakanishi | F16C 23/084 |
| | | | | | 384/906 |
| 4,687,351 | A | * | 8/1987 | Martinie | F16C 35/063 |
| | | | | | 384/541 |
| 6,092,956 | A | * | 7/2000 | Swinley | F16D 1/0847 |
| | | | | | 403/373 |

FOREIGN PATENT DOCUMENTS

| | | |
|---|---|---|
| JP | 2009293764 | 12/2009 |
| JP | 2010043690 | 2/2010 |

OTHER PUBLICATIONS

Search Report for Italy Patent Application No. 2021000012425 dated Jan. 18, 2022.
Search Report for Italy Patent Application No. 2021000012422 dated Jan. 18, 2022.

* cited by examiner

BEARING UNIT FOR WINDROWERS

CROSS-REFERENCE FOR RELATED APPLICATIONS

This application is based on and claims priority to Italian Application No. 102021000012428, filed May 14, 2020, under 35 U.S.C. § 119 the entire contents of which are incorporated herein by reference.

FIELD

The present disclosure relates to a bearing unit for windrowers provided with mechanical rakes hitched to a tractor.

This bearing unit is suitable for use in manufacturing, and above all in the agricultural sector as it is simple and inexpensive to produce.

BACKGROUND

Bearing units may be provided with rolling elements and systems for clamping the unit to a rotary shaft.

BRIEF DESCRIPTION OF THE DRAWINGS

The disclosure will now be described with reference to the appended drawings illustrating various non-limiting exemplary embodiments by way of example, in which.

DETAILED DESCRIPTION

Windrowers may include a radially inner ring secured in an axially adjustable manner to a rotating support shaft for a respective mechanical rake, and a radially outer ring inserted in a housing which is stationary with respect to the rotating shaft, but which in turn has a rotary motion with respect to the windrower itself so as to allow the rakes to perform the windrowing work. In any case, the radially inner ring and the radially outer ring rotate with respect to one another and the rotation of one ring with respect to the other is permitted by a plurality of rolling elements, positioned inside respective raceways formed both internally to the radially outer ring and externally to the radially inner ring.

The bearing units described above may further include a system for locking on the rotating shaft, and when this rotating shaft is a hollow shaft, this locking system is such that the radially inner ring and the shaft are provided with through holes, axially corresponding, into which an elastic element (bolt, dowel or the like) is inserted under pressure so as to rigidly secure the two components together. Although simple, the use of the through hole/elastic bolt solution has a number of disadvantages owing both to the need to drill the hollow shaft to allow the locking dowel to pass through, and to the fact that the optimal position of the bearing unit does not always correspond to the point at which, on the rotating shaft, a through hole is made for an elastic dowel. There is therefore a need for a bearing unit in which the system for immobilizing the radially inner ring on a rotating shaft makes it possible to overcome the above-mentioned disadvantages.

The present disclosure provides a bearing unit for windrowers which does not have the above mentioned disadvantages.

The present disclosure provides a bearing unit for windrowers having the features defined in the attached claims.

Figure 1:
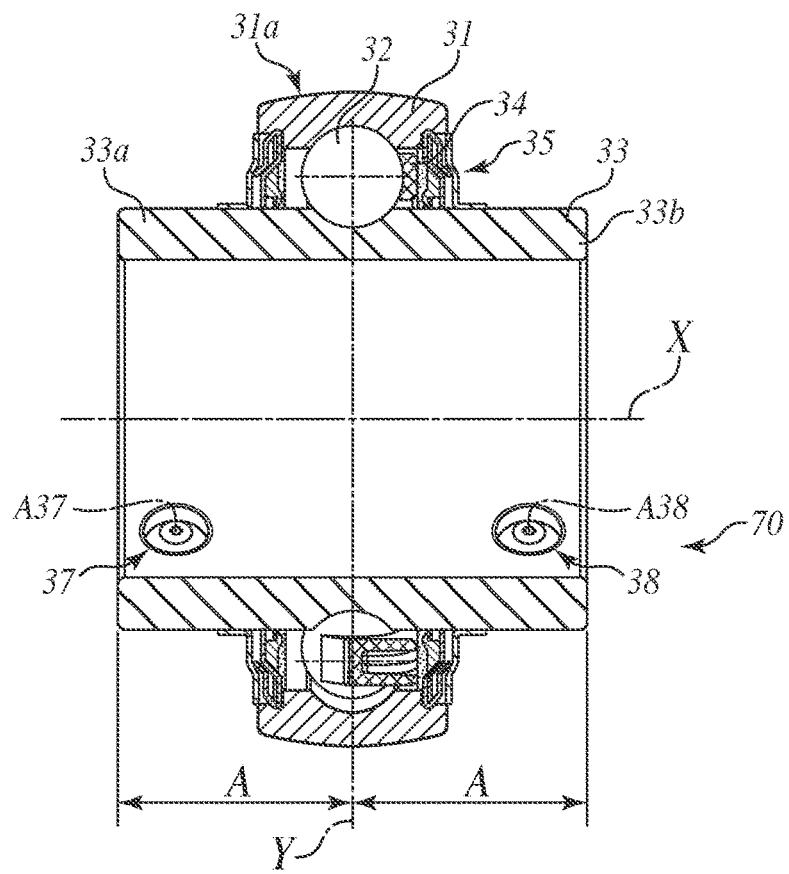
FIG. 1 is a view, in cross section, of a bearing unit for windrowers according to exemplary embodiments of the present disclosure.

Referring to FIG. 1, the reference sign 10 generally designates a bearing unit which, according to the present disclosure, is advantageously applicable to the agricultural sector and/or manufacturing industry—for example textile, mining, automotive or food industry—and which can be interposed, for example, between a rotating shaft and a housing element, which do not form part of the present disclosure.

The bearing unit 10 is for example used in windrowers provided with mechanical rakes hitched to a tractor, and having a plurality of shafts, which are mutually parallel so as to rotate with respect to a shared central axis transverse to a direction in which the tractor is driven, and are each provided with a plurality of equidistant tines to move the cut forage in order to collect it in longitudinal rows called windrows. The shafts are supported and kept equidistant from one another by means of two rotary end casings and two or more rotary casings distributed along the central axis, and the bearing unit 10 is interposed right between each shaft and the relative casing so as to allow the shafts to rotate with respect to the casings during the rotation of the casings about the central axis.

In various embodiments, the bearing unit 10 includes a radially outer ring 31, which is stationary and includes a radially outer spherical surface 31a with a convex shape; a radially inner ring 33, which rotates about a central axis of rotation X of the bearing unit 10, mounted on a rotating or oscillating shaft (which is known and therefore not shown in the figure) of the rake; a plurality of rolling bodies 32 interposed between the radially outer ring 31 and the radially inner ring 33, and a cage 34 for holding the rolling bodies so as to keep the rolling elements of the row of rolling bodies 32 in position.

Throughout this description and in the claims, terms and expressions indicating positions and orientations, such as "radial" and "axial", are understood to refer to the central axis of rotation X of the bearing unit 30.

The bearing unit 10 is also provided with sealing means 35 for sealing the bearing unit from the external environment. Below, the sealing means 35 may be more simply called seals 35, this clearly referring to the same component.

The radially inner ring 33 is divided, with respect to an axis of symmetry Y of the plurality of rolling bodies 32, into two cylindrical portions 33a, 33b of equal axial dimension A, projecting outside the radially outer ring 31, from opposite sides of the radially outer ring 31 itself.

Figure 2:
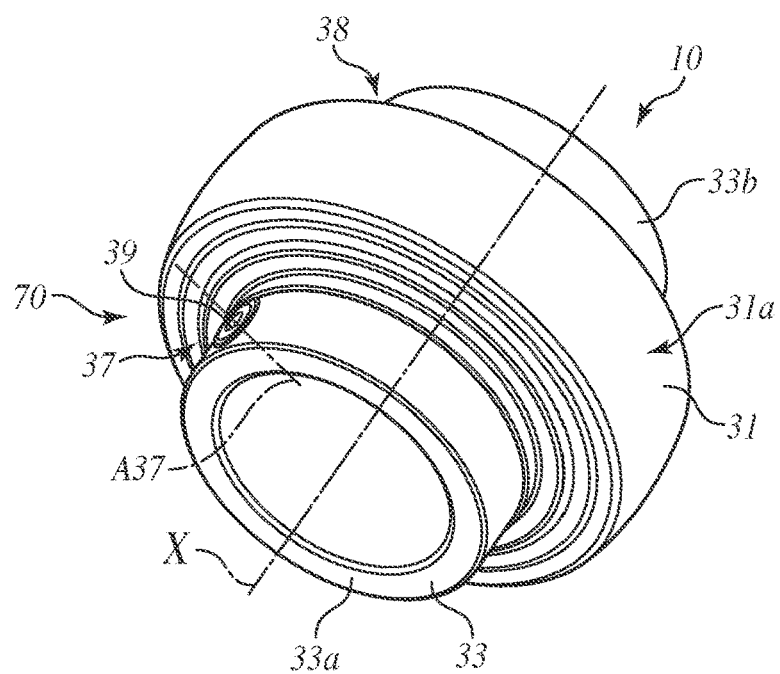
FIG. 2 is an axonometric view of the bearing unit of FIG. 1.

Moreover, according to the various embodiments of this disclosure, a threaded through hole 37, 38 for receiving a grub screw 39 (see FIG. 2) is made in each cylindrical portion 33a, 33b of the radially inner ring 33, the axes A37, A38 of the two threaded holes being orthogonal and incident to the rotation axis of the bearing unit X. In other words, the two threaded holes 37, 38 are made through the radially inner ring 33, from opposite sides with respect to the radially outer ring 31 and to the plurality of rolling bodies, and they may be engaged both simultaneously by relative grub screws 39 and alternately according to the locking needs. The two threaded through holes 37, 38 and the relative grub screws 39 define the locking system 70 for locking the bearing unit 10 on the shaft and this system 70 thus constructed makes it possible, above all, to make the axial position of mounting of the bearing units 10 independent of any through holes made through the shafts of said rakes, also making it possible to modulate an axial clamping force through the use of only one or both threaded through holes 37, 38.

Moreover, because the radially inner ring 33 is axisymmetric with respect to the vertical axis Y of the bearing unit 10 (axis passing through the center of the rolling bodies 32 and the raceways of the rings), the locking achieved by the locking system 70 is also very balanced.

Various embodiments of this disclosure provide versatility of the solution given the possibility of selecting how many grub screws 39 to use and which threaded holes 37, 38 to use; better axial clamping force with respect to known solutions that use an elastic dowel; better balancing of the bearing unit 10 thanks to the symmetry of the radially inner ring 33; and easier for the user to assemble the entire windrower unit.

In addition to the embodiments of the disclosure as described above, note that it encompasses many other variants. Moreover, note also that these embodiments are merely examples and do not limit the scope of the disclosure, or its uses, or its possible configurations. On the contrary, while the above description will allow a person skilled in the art to implement the present disclosure at least according to one exemplary configuration thereof, note that many variants of the components described are possible without departing from the scope of the disclosure, as defined in the attached claims, which are interpreted literally and/or according to their legal equivalents.

The invention claimed is:

1. A bearing unit, comprising:
    a radially outer ring comprising a radially outer spherical surface with a convex shape;
    a radially inner ring configured to be mounted on a rotating or oscillating shaft;
    a plurality of rolling bodies interposed between the radially outer ring and the radially inner ring to allow the relative rotation of the radially outer ring and inner ring; and
    a locking system comprising:
        exactly two threaded through holes formed in the radially inner ring, one of each of the two threaded through holes formed on respective opposite bands of the radially inner ring with respect to the radially outer ring and with respect to the plurality of rolling bodies; and
        a respective grub screw for each threaded through hole and configured to lock the radially inner ring on the rotating or oscillating shaft;
        wherein the radially inner ring is divided, with respect to an axis of symmetry (Y) of the plurality of rolling bodies, into two cylindrical portions forming a unitary piece projecting outside the radially outer ring, from opposite bands of the radially outer ring itself; wherein the two cylindrical portions have an equal axial dimension (A) and each of the two cylindrical portions is provided with one of the threaded through hole.

2. The bearing unit of claim 1, wherein axes of the two threaded holes are orthogonal and incident to a central rotation axis of the bearing unit (X).

3. The bearing unit of claim 2, further comprising a cage holding the plurality of rolling bodies interposed between the radially outer ring and the radially inner ring.

4. The bearing unit of claim 1, further comprising a cage holding the plurality of rolling bodies interposed between the radially outer ring and the radially inner ring.

\* \* \* \* \*